United States Patent [19]

Lembach et al.

[11] Patent Number: 4,698,760

[45] Date of Patent: Oct. 6, 1987

[54] METHOD OF OPTIMIZING SIGNAL TIMING DELAYS AND POWER CONSUMPTION IN LSI CIRCUITS

[75] Inventors: Robert F. Lembach; Steven D. Lewis; Robert R. Williams, all of Rochester, Minn.

[73] Assignee: International Business Machines, Armonk, N.Y.

[21] Appl. No.: 741,922

[22] Filed: Jun. 6, 1985

[51] Int. Cl.⁴ .................................................. G06F 15/60
[52] U.S. Cl. ...................................... 364/490; 364/488
[58] Field of Search .............. 364/488, 489, 490, 491, 364/569

[56] References Cited

U.S. PATENT DOCUMENTS

| T935003 | 6/1975 | Linville et al. | 364/490 |
| 3,702,003 | 10/1972 | Ramirez, Jr. et al. | 364/489 |
| 4,263,651 | 4/1981 | Donath et al. | 364/300 |
| 4,593,363 | 6/1986 | Burstein et al. | 364/491 |

OTHER PUBLICATIONS

Donze et al., *PHKO-A VLSI Design System*, 19th Design Automaton Conference, IEEE, 1982, Paper 12.1, pp. 163–69.

*Primary Examiner*—Errol A. Krass
*Assistant Examiner*—Daniel W. Juffernbruch
*Attorney, Agent, or Firm*—Paul L. Sjoquist

[57] ABSTRACT

A method of optimizing signal timing delays and power consumption through multi-path LSI circuits constructed from a plurality of circuit blocks, each circuit block having associated therewith a plurality of power levels which are selectable to control the timing delays through the circuit block, wherein the method steps include the formation of a power-performance derivative for each circuit block, identifying therefrom the relative contribution to signal delay of the circuit block in the entire multi-path configuration, and selecting the optimum power level for an overall multi-path minimum signal delay condition, through a process of iterative calculation of timing delays through individual circuit blocks and multi-path timing analysis.

6 Claims, 4 Drawing Figures

METHOD OF OPTIMIZING SIGNAL TIMING DELAYS AND POWER CONSUMPTION IN LSI CIRCUITS

BACKGROUND OF THE INVENTION

The present invention relates to the efficient design of very-large-scale integrated (VLSI) circuits, and more particularly to a method for optimization of signal timing delays through LSI circuits by proper selection of circuit power levels.

The problem of designing LSI circuits within predefined timing constraints is well known, and can be simply stated as a problem of minimizing the power consumption of an LSI circuit subject to the timing constraints imposed upon the LSI circuit by virtue of its interconnection to other circuits. In any complex digital system, signals are transmitted and received by individual circuits, requiring interdependent timing relationships for proper and integrated operation. Such circuits function by detecting the presence or absence of signals at predetermined input terminals within a predetermined time "window", performing various predesigned logical combinations on the basis of these detected signals, and developing output signals for subsequent processing by other circuits. Systems are designed with complex interactions of such circuits, according to an overall timing scheme which ensures the proper timed interaction of all circuits.

In LSI circuit design, it has become the practice to formulate an overall LSI chip from the predetermined interconnection of a plurality of individual circuit cells. A typical LSI chip may have several thousand circuit cells constructed thereon, individual cells being constructed from a standardized manufacturing process which is simultaneously applied to develop the LSI chip. One or more standardized cells are interconnected to form various logic combinations, to perform specified logic functions, each of which may be identified as a logic block of some predetermined definition. Logic blocks have characteristically been designed with inherent power drive circuitry, and specifically with the capability of providing multiple levels of power drive capability.

The switching times of individual transistor circuits are known to be a function of the power applied to the circuit, and in the case of logic blocks it is advisable to provide the capability of multiple power drive levels to permit selection of an appropriate power level to achieve a predetermined system timing parameter.

Of course, it is possible to achieve the fastest signal transmission times by merely selecting the highest possible power level, but in a complex system having thousands of circuit interconnections it is neither necessary nor desirable to achieve the fastest possible individual circuit transmission times, for different logic blocks have different serial circuit interconnections and therefore inherently provide different signal delays from input to output. Further, merely assigning the highest possible power level to each circuit block for achieving maximum speed leads to unnecessary power consumption when such speed is unnecessary. Therefore, the problem is one of determining the minimum power requirements for a given combination of logic blocks consistent with the overall and interdependent timing requirements of those logic blocks.

Previous methods have been developed for determining the timing characteristics of a plurality of logic blocks, and to provide an indication of timing path delays between the blocks. U.S. Pat. No. 4,263,651, issued Apr. 21, 1981, shows a method for analyzing logic blocks arranged in predetermined circuit configurations to identify critical timing paths and to determine whether the path delays of such critical paths are too long or too short. This method enables individual logic blocks to be redesigned whenever critical paths are identified which are either too long or too short, in order to provide an overall system for reliable operation. Likewise, analytical power/timing techniques have been described for optimizing logic circuit designs, such as described in a paper entitled "Analytical Power/Timing Optimization Technique for Digital System", presented at the Fourteenth Design Automation Conference on June 20-22, 1977, in New Orleans, La., by A. E. Ruehli, P. K. Wolff, Sr., and G. Goertzel of the IBM Thomas J. Watson Research Center. This paper describes a method for logic gate delay assignment which achieves power minimization of digital logic while satisfying system timing, but which requires simplistic assumptions of the power/delay model in order to perform the analysis.

A further description of a design technique for circuits of this type is discussed in a paper entitled "Philo - a VLSI Design System", presented at the Nineteenth Design Automation Conference, June 14-16, 1982, Las Vegas, Nev., by the authors R. Donze, J. Sanders, M. Jenkins, G. Sporzynski, of the IBM Corporation. This paper describes a VLSI circuit design technique with which the present method is uniquely adaptable, and further describes a delay calculator/optimizer software program which functions by analyzing each logic block to determine its output load capacitance, calculating its circuit delay, comparing this delay to a delay goal and then selecting a higher power level if the original delay does not meet the goal. This technique assumes a worst-case delay goal for individual logic blocks, with no consideration of overall system timing constraints, merely setting forth a technique for achieving individual circuit block timing goals without necessarily considering the overall impact of a plurality of such logic blocks in a total system timing problem.

There is a need to provide a method for optimizing power consumption of individual logic blocks, consistent with overall system timing requirements and goals, wherein individual logic block power levels may be selected and adjusted for achieving overall system timing requirements. The present invention achieves this result, through application of the method described herein.

SUMMARY OF THE INVENTION

The method of the present invention is applicable for use in connection with logic blocks wherein each of the blocks has the capability for selecting multiple power drive levels, as for example by the incorporation into the logic block of a plurality of parallel power drive transistors, which may be selectively coupled into the circuit. In this context, the method may be summarized as comprising the steps of initializing all logic blocks to the lowest power drive level; calculating all timing delays through each of the logic blocks; performing a timing analysis through the entire logic network, based on the individual logic block timing delays; comparing the overall timing delays with a required timing delay for the overall logic network and thereby calculating a "lateness" value for the network; and allocating the respective logic block contribution to the overall "lateness" to each of the logic blocks; setting all of the logic blocks to their next highest power drive level, and repeating the calculation of time delays and timing analysis; computing the "lateness" performance derivatives with respect to each of the logic blocks to determine the rate of contribution toward "lateness" or negative timing delay for each of the logic blocks, and identifying which of the logic blocks have the largest "lateness" performance derivatives; increasing the power drive level of a predetermined number of the logic circuit blocks having the highest "lateness" performance derivatives and recalculating the overall timing values; and repeating the above steps until no further reduction in "lateness" occurs for an incremental increase in the power drive level, or until no timing delay problems exist.

BRIEF DESCRIPTION OF THE DRAWINGS

The foregoing method will become apparent from the following specification and claims, and with reference to the appended drawings in which:

DESCRIPTION OF THE PREFERRED EMBODIMENT

Figure 1:
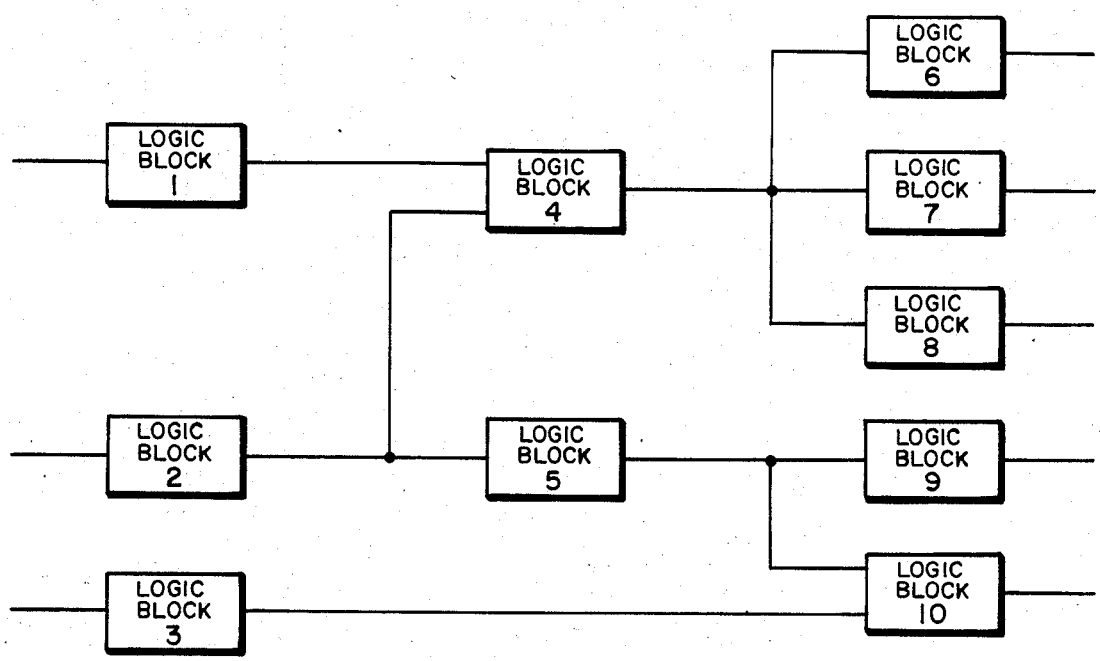
FIG. 1 shows in schematic form an example of a logic network having ten logic blocks.

Referring first to FIG. 1 there is shown an example of a representative logic network comprising ten logic blocks, which can be used to describe the present method. For purposes of this description we will assume that each of the logic blocks 1–10 shown in FIG. 1 has the capability of selecting from five power levels to accomplish successive increases in signal transmission speed as may be required by the overall logic network design. The term "power level" is a broad description that describes how much circuit drive power is required in a logic block to deliver and output signal within a predetermined time after receiving an input signal. For every power level there is a "penalty" which may be described in terms of power consumption or in some other relevant term. In conventional field effect transistor (FET) logic or bipolar logic, the power level is simply the power consumption of a logic block, usually defined in milliwatts, and the "penalty" is the milliwatt power consumption required to achieve a predetermined switching time. In CMOS technology there is no power except that briefly needed to charge or discharge capacitance, and therefore to drive larger loads more quickly, devices are made larger. The power in watts (or milliwatts) is directly proportional to capacitance switched. Although power is usually negligible for small chips, it can become critical for large chips operating at high frequencies. For this reason it is desirable to keep gate sizes as small as possible. The "penalty" in CMOS technology is the switching noise generated and the additional loading that larger devices present to previous devices in the network.

Figure 2:
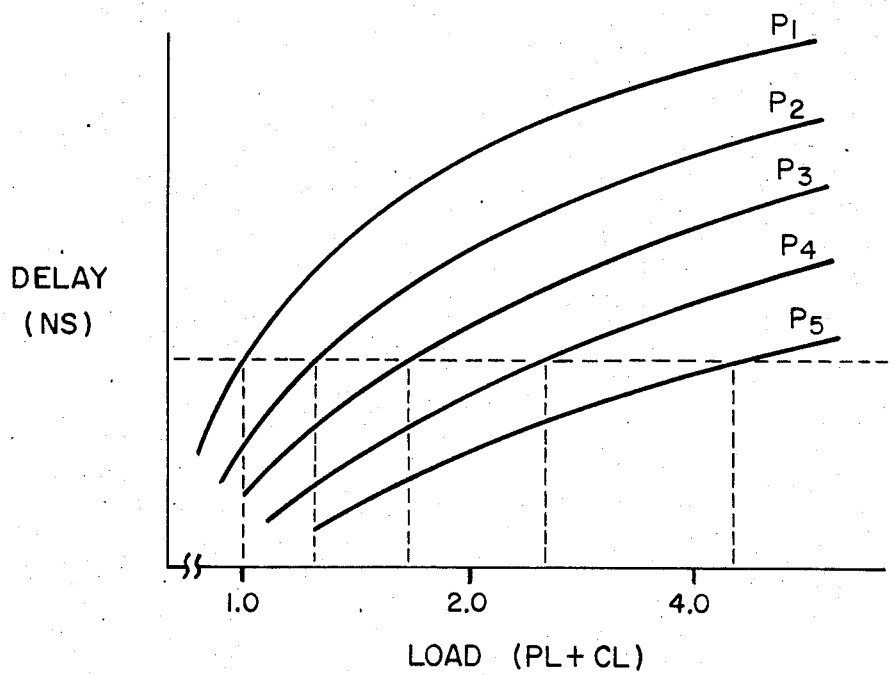
FIG. 2 shows a graph illustrating the effect of power levels on time delay and load.

For purposes of the example shown on FIG. 1 we will make certain assumptions concerning the available power levels and the relationships between delay, power level and loading of the respective logic blocks. FIG. 2 shows a representative graph of the relationship of delay as a function of load as used herein. Each of the curves P1, P2, P3, P4, and P5 represent respective different power levels, in respective increasing magnitudes. The horizontal scale is stated in terms of "load", which is a function of any particular logic block internal design. The chart of FIG. 2 shows that, for any given load an increase in power level results in a net decrease in the delay time through the logic block. Conversely, for any stated delay time requirement and logic block load requirement, the chart of FIG. 2 shows the power level which must be used in order to achieve the stated delay time with the given load. For example, the horizontal dotted line, indicative of a constant delay time, shows the respective logic block loads which can be driven at the various power levels. In other words, the same delay time will occur under power level P1 for a logic block circuit having a normalized load of 1.0, whereas power level P5 is required to achieve this delay time with a normalized load of 4.0. It is apparent that the relationship between delay time and load is a nonlinear function of power level, but for any given logic block the relationship is readily determined.

There is a further load factor which must be considered in the design of networks including many interconnected logic blocks. This loading factor is a function of the number of different logic blocks which are driven by a particular logic block, the load on the driving logic block being directly proportional to the number of logic blocks to which its output is connected. This loading effect also varies with power level, and may be empirically determined. For purposes of the description herein this loading will be identified as pin loading (PL) and will be represented by a coefficient for each power level. The pin loading (PL) associated with the output logic blocks 6–10 is presumed for purposes of the present example to be zero, because for output logic blocks the loading effects tend not to vary with changes in power level. This is because the output logic blocks are frequently connected to latch circuits which present essentially a constant load at their input irrespective of the power levels selected.

In order to simplify the explanation of the method described herein we will assume that a single delay equation may be used, with different coefficients for each power level. At any given power level a logic block is characterized by a predetermined fixed delay plus a variable delay which is determined by multiplying a coefficient representative of that power level times the sum of the logic block circuit load (CL) and the pin load (PL). This equation is shown in the following Table 1:

TABLE 1

| Power Level | PIN LOAD Coefficient (PL) | Delay Equation | Load Penalty |
|---|---|---|---|
| P1 | 0.5 | 10 + 5 (PL + CL) | 1.0 |
| P2 | 0.8 | 8 + 4 (PL + CL) | 1.2 |
| P3 | 1.0 | 6 + 3 (PL + CL) | 1.5 |
| P4 | 1.3 | 4 + 2 (PL + CL) | 2.3 |
| P5 | 1.5 | 2 + 1 (PL + CL) | 4.6 |

Table 1 shows that for increasing power levels the pin load coefficient increases. That is, the loading effect of subsequent logic blocks increases the power consumption as a result of increasing the power level in the driving logic block. Table 1 also shows that the delay equation coefficients become smaller as the power level is increased from P1 to P5. The last column of Table 1 shows the load penalty which occurs as a result of increasing power levels; that is, the power consumption in milliwatts which occurs as a result of achieving a shorter delay time. All of the numerical coefficients of Table 1 may be empirically determined, and will be presumed to hold true for the example provided herein. Other forms of more complex delay calculation may be required in particular cases, but the simple equation of Table 1 is used here for illustration.

For purposes of the present example it will be assumed that each of the logic blocks shown in FIG. 1 has a predetermined load which is the function of the fixed conductor coupling used to interconnect the logic blocks. This load may be stated in terms of milliwatts, or for purposes of the present example in terms of normalized units, as follows:

TABLE 2

| Logic Block | Load (CL) | No. Pin Connections |
|---|---|---|
| 1 | 2 | 1 |
| 2 | 3 | 2 |
| 3 | 1 | 1 |
| 4 | 5 | 3 |
| 5 | 1 | 2 |
| 6 | 2 | 0 |
| 7 | 3 | 0 |
| 8 | 1 | 0 |
| 9 | 4 | 0 |
| 10 | 1 | 0 |

Table 2 shows the assumed load for each of the logic blocks 1-10, which will be used in the example to be described herein. Table 2 also shows the number of pin connections at the respective outputs of each of the logic blocks of FIG. 1, which may be determined by inspection of FIG. 1. For example, logic block 1 has a single output connection to logic block 4; logic block 4 has three output connections to logic block 6, 7 and 8; logic block 2 has two output connections to logic blocks 4 and 5.

Using the information shown on Tables 1 and 2, it is possible to derive the respective delays of logic blocks 1-10, as shown in FIG. 1, for each of the power levels P1-P5. For example, Table 3 shows the respective time delays through each of the logic blocks 1-10 for power level P1. Applying the delay equation of Table 1 to the load information relating to logic block 1 as shown in Table 2, the time delay of 22.5 is calculated for logic block 1; this is the time which a signal at the input of logic block 1 would be delayed before the signal would be available at the output of logic block 1. Similarly, calculations may be made for each of the logic blocks 2-10 from the data presented in Tables 1 and 2. By considering the logic block connections of FIG. 1 it is possible to calculate the absolute time when a signal would arrive at the output of any given logic block. For example, logic block 4 has an output signal at an absolute time which is dependent on the delays through logic blocks 1 and 2, as well as the delay through logic block 4. The signal inputs to logic block 4 arrive at an absolute time of 22.5 (block 1) and 30.0 (block 2). The latest of these times is 30.0, which is added to the time delay of logic block 4 (42.5) to produce the absolute time of 72.5 as the time when the signal output of logic block 4 would be available. Similar calculations can be made with respect to all of the logic blocks of FIG. 1, to produce the absolute time tabulation shown in Table 3. This time tabulation shows that the earliest signal output from the entire network occurs at an absolute time of 65.0 (block 10), whereas the latest signal output from the entire network occurs at time 97.5 (block 7).

TABLE 3

| Logic Block | Power Level | Time Delay | Abs. Time |
|---|---|---|---|
| 1 | P1 | 22.5 | 22.5 |
| 2 | P1 | 30.0 | 30.0 |
| 3 | P1 | 17.5 | 17.5 |
| 4 | P1 | 42.5 | 72.5 |
| 5 | P1 | 20.0 | 50.6 |
| 6 | P1 | 20.0 | 92.5 |
| 7 | P1 | 25.0 | 97.5 |
| 8 | P1 | 15.0 | 87.5 |
| 9 | P1 | 30.0 | 80.0 |
| 10 | P1 | 15.0 | 65.0 |

In order for the information shown on Table 3 to have a relevant meaning in connection with the present method, it is necessary to know the absolute times when output signals are required from the logic blocks in order to meet the design constraints of the overall system. For purposes of the present example we have presumed a set of timing requirements for which output signals are required at the outputs of blocks 6-10 at the absolute times shown in Table 4. Once the absolute output times are known, it is then possible to calculate the other values which are useful in connection with the present method.

For purposes of performing the method it is helpful to define a "slack" time, as the difference between the absolute time when a signal is required to be at a particular output, from the absolute time when the signal actually appears at the output. Using this definition of slack time it is possible to calculate for each of the logic blocks of FIG. 1, under the conditions of any power driving level, the slack time for the logic block.

Furthermore, it is helpful to define a "lateness" time, as the sum of all of the negative slacks which produce a given output from the overall logic network. For example, Table 4 shows the absolute time required for signal outputs at logic blocks 6-10 is 50, 50, 50, 70, and 80 (nanoseconds) respectively. There are no absolute time requirements for logic blocks 1 through 5, as these logic blocks are internal to the overall logic network, and normally would not be assigned an absolute time requirement.

TABLE 4

| Logic Block | Abs. Time Required | Slack Time | Lateness Time |
|---|---|---|---|
| 1 | — | −40.0 | −127.5 |
| 2 | — | −47.5 | −137.5 |
| 3 | — | +47.5 | 0.0 |
| 4 | — | −47.5 | −127.5 |
| 5 | — | −10.0 | −10.0 |
| 6 | 50 | −42.5 | −42.5 |
| 7 | 50 | −47.5 | −47.5 |
| 8 | 50 | −37.5 | −37.5 |
| 9 | 70 | −10.0 | −10.0 |
| 10 | 80 | 15.0 | 0.0 |

Referring to the times shown in Table 3, and with reference to the absolute time requirement shown in Table 4, it is possible to calculate for each logic block a slack time. For example, Table 4 shows the signal output from block 6 is required at absolute time=50, whereas reference to Table 3 (and FIG. 1) shows that the output from logic block 6 depends upon the signals from logic block 4, which in turn depends upon signals from logic blocks 1 and 2. The time delays through logic blocks 1, 4 and 6 total 85.0 nanoseconds; time delays through logic blocks 2, 4 and 6 total 92.5 nanoseconds. Therefore, since the signal is required to be at the output of logic block 6 at a time of 50 nanoseconds, there is a slack time of −42.5 (50 minus 92.5) at the output of logic block 6 under the conditions of power level P1 being applied to all ten logic blocks. The slack time for logic block 1 is calculated by adding the time delays of logic block 1, logic block 4, and the largest of the respective time delays for logic blocks 6–8; in other words, the time delay of logic block 1 (22.5) plus the time delay of logic block 4 (42.5) plus the largest time delay of logic blocks 6–8 (25.0), yields a signal time which, when subtracted from the required signal time (50) yields a slack time for logic block 1 of −40.0. Similar calculations can be made to produce the data shown in Table 4 under the "slack time" heading.

The "lateness time" is defined as the sum of all of the negative slacks at all of the logic network outputs which are affected by a particular logic block. For example, logic block 1 affects the outputs from logic blocks 6–8, and therefore has a lateness value which is the sum of the slacks of logic blocks 6–8 (−42.5, −47.5, −37.5), yielding a lateness time for logic block 1 of −127.5. Similarly, logic block 2 affects the slack time values of all of the outputs from logic block 6–10, and adding the negative slack times from all of these logic blocks produces a lateness value for logic block 2 of −137.5. Logic block 3 affects only the output from logic block 10, and since the slack time from logic block 10 is a positive slack, the "lateness" time of logic block 3 is zero. Similar calculations can be made with respect to logic blocks 4–10, to produce the data shown in Table 4 under the heading "lateness time".

Figure 3:
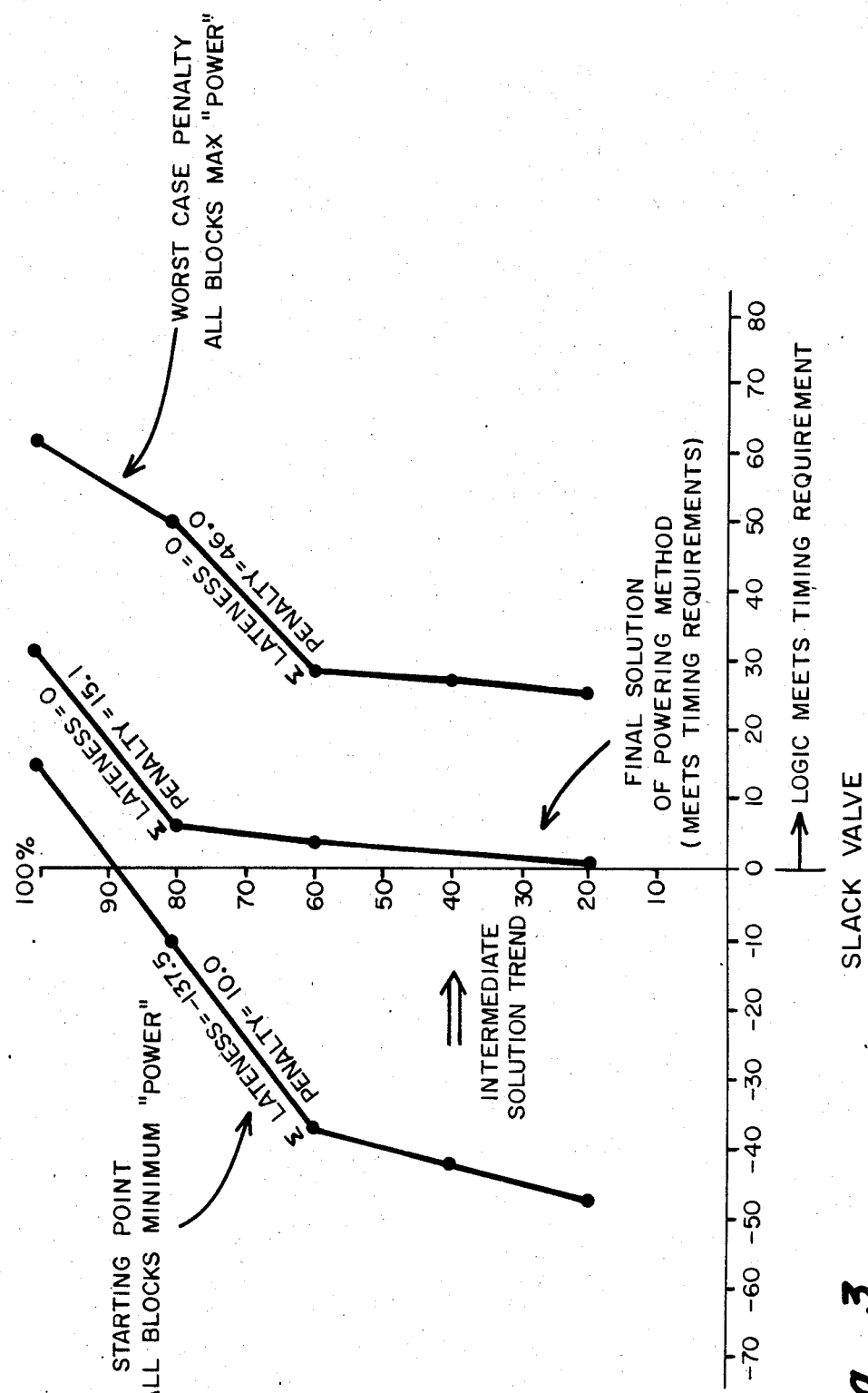
FIG. 3 shows a graph illustrative of the method.
Figure 4:
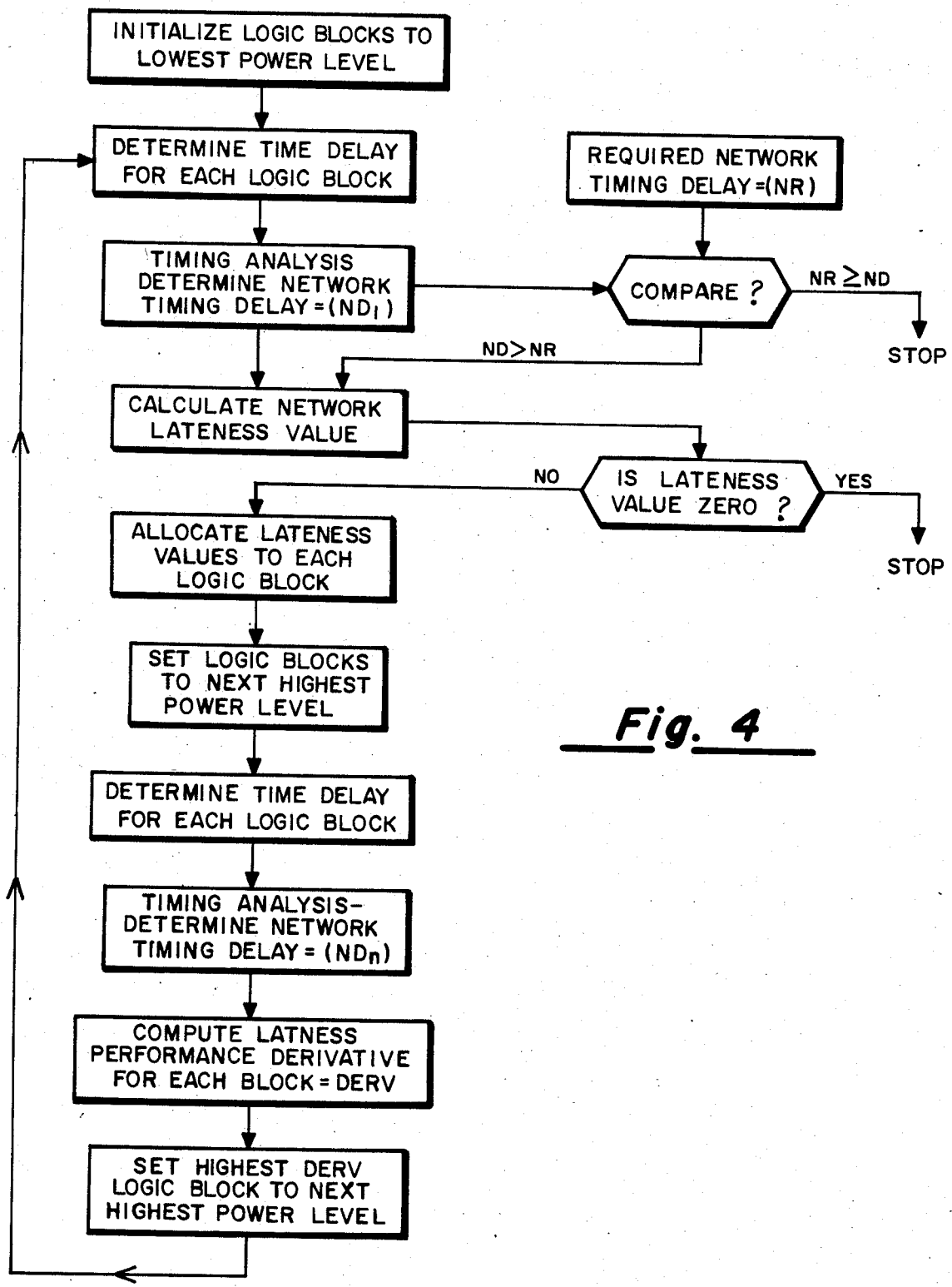
FIG. 4 shows a flow chart of the method.

Referring next to FIG. 3, there is shown a series of curves plotted on a graph which is representative of the present method. The horizontal scale of the graph of FIG. 3 represents "slack time" as defined above, and is incrementally calibrated from a series of negative slack values to a series of positive slack values, centered about a "zero point", which represents the minimum acceptable slack value required for the logic network in order to meet the design requirements for signal outputs from the logic network. In order for the logic network to meet the minimum design requirements all logic blocks must have a slack time which is zero or positive. The vertical scale of the graph of FIG. 3 is plotted in percentage, to indicate the percentage of logic blocks in the entire logic network which fall below any predetermined slack time.

The left-most curve in FIG. 3 is plotted from the data shown in Table 4, which is a tabulation of slack times for the various logic blocks under conditions of power level P1. Under conditions of power level P1 all ten logic blocks have the minimum power applied to them, thereby incurring a load penalty of 1.0 (milliwatt), as shown in Table 1. Since all logic blocks are at a P1 power level the total load penalty is 10.0 (milliwatts). The left-most curve of FIG. 3 therefore shows that, under conditions of minimum power drive, approximately 90 percent of the logic blocks have slack times less than the design timing requirements. The graph indicates that at least some logic block power levels will have to be increased in order to meet the minimum design timing requirements, and it is the object of the present method to develop an approach for selectively setting the power drive requirements of appropriate logic blocks so as to ensure that all slack times become positive, at the lowest overall power consumption penalty. The middle curve of FIG. 3 shows an example of a curve wherein design timing requirements are met, according to the teachings of the present method, wherein the power consumption penalty is nearly optimally minimized. The right-most curve in FIG. 3 shows a curve plotted under worst case conditions, wherein all logic block power drive levels have been set to power level P5. Under these conditions, it is apparent that the slack times of all logic blocks clearly meet design timing requirements, but at a power consumption penalty of 46.0. The implementation of the present method will enable the designer to identify the proper combination of power drive levels for the logic blocks in order to achieve the middle curve of FIG. 3.

As a further step in performing the method the power drive levels of all ten logic blocks are set to the next highest power level (P2), and the data shown in Tables 3 and 4 is recalculated under power level P2 conditions. The results of these calculations are shown in Table 5, wherein it is apparent that the slack times will vary from −34.0 (blocks 2 and 7) to +52.8 (block 3). The lateness time, as defined above, varies from −90.0 to 0. The data of Table 5 shows some overall improvement in slack time and lateness time, but indicates that minimum design timing requirements are not met when all logic blocks are set at power level P2.

The next step in performing the method is to formulate a derivative which may be utilized to identify which logic blocks will contribute the most toward meeting the design timing requirements through an upward adjustment of power drive level, for the least increase in load penalty. This derivative is defined as follows:

$$DERV = \frac{LATENESS\ (1) - LATENESS\ (2)}{PENALTY\ (1) - PENALTY\ (2)}$$

The derivative (DERV) calculation is therefore made from the data presented in Tables 4 and 5, which show the respective lateness times for each logic block, and from the load penalty data shown in Table 1, which presents the load penalty for any given power drive level. Table 5 shows the results of the DERV calculation, and indicates that logic block 2 has the largest DERV value (237.5). This suggests that logic block 2, at a minimum, should be set to power level P2 for the next step of performing the method. To perform this step, all of the logic block power levels are reset to power level P1, with the exception of logic block 2 which is set to power level P2. The time delays, slack times and lateness times are recalculated under these power drive conditions, to obtain the results shown in Table 6. Next, the power levels of each of the logic blocks 1–10 are incrementally increased by one power level and the data is recalculated, including the DERV data, as is shown in Table 7.

Table 7 shows that the relative contributions to lateness can be improved most by upwardly adjusting the power levels to logic blocks 1 and 4, as these logic blocks show the largest value for DERV (196.5). Therefore, the next iterative step of the method will be performed by incrementally increasing the power drive level of blocks 1 and 4 to the next highest level (P2).

Tables 8 and 9 show the results of the calculations from setting the power levels incrementally one step higher for logic blocks 1 and 4 (Table 8), and then incrementing all power levels one level to obtain the DERV value (Table 9), according to the method previously described. Table 9 shows that the maximum contribution toward reducing the total lateness will be obtained by incrementally increasing the power level of logic block 2, for logic block 2 shows a DERV value of 163.3.

It is apparent from the description of the method steps performed that each iterative cycle of the method involves two sets of calculations: first, the power level of the logic block having the highest DERV value is incrementally increased, and slack times and lateness times are calculated for all logic blocks; second, all power levels for all logic blocks are incrementally increased to provide a secondary calculation of slack times and lateness time; third, the DERV value is calculated from the respective two sets of forementioned calculations; fourth, the power level of the logic block having the highest DERV value is incrementally increased and the steps are repeated. Each time the iterations are repeated the slack times and lateness times resulting from the calculations reduce toward zero, and the iterations are continued until the total lateness times for all logic blocks become equal to zero. When this is achieved the method yields the necessary power levels for each and every circuit block in order that the minimum timing requirements may be met, consistent with the lowest overall power penalty.

Tables 4 and 5, 6 and 7, 8 and 9, represent three iterations of the method described herein. During these three iterations the lateness time decreased from −137.5 to −92.8, while the total power penalty increased from 10.0 to 10.6.

Table 10 shows in abbreviated form the results of iterations No. 4, No. 5, and No. 6. These iterations produce successively smaller lateness times and successively smaller DERV values, the lateness times decreasing from −69.6 to −42.7, and the power penalty increasing from 10.9 to 11.7.

TABLE 5

| Logic Block | Power Level | Time Delay | Abs. Time | Slack Time | Lateness Time | Derv |
|---|---|---|---|---|---|---|
| 1 | P2 | 19.2 | 19.2 | −26.8 | −90.0 | 187.5 |
| 2 | P2 | 26.4 | 26.4 | −34.0 | −90.0 | 237.5 |
| 3 | P2 | 15.2 | 15.2 | +52.8 | 0.0 | 0.0 |
| 4 | P2 | 37.6 | 64.0 | −34.0 | −90.0 | 187.5 |
| 5 | P2 | 18.4 | 44.8 | +1.2 | 0.0 | 50.0 |
| 6 | P2 | 16.0 | 80.0 | −30.0 | −30.0 | 62.5 |
| 7 | P2 | 20.0 | 84.0 | −34.0 | −34.0 | 67.5 |
| 8 | P2 | 12.0 | 76.0 | −26.0 | −26.0 | 57.5 |
| 9 | P2 | 24.0 | 68.8 | +1.2 | 0.0 | 50.0 |
| 10 | P2 | 12.0 | 56.8 | +23.2 | 0.0 | 0.0 |

TABLE 6

| Logic Block | Power Level | Time Delay | Abs. Time | Slack Time | Lateness Time |
|---|---|---|---|---|---|
| 1 | P1 | 22.5 | 22.5 | −40.0 | −109.5 |
| 2 | P2 | 24.0 | 24.0 | −41.5 | −113.5 |
| 3 | P1 | 17.5 | 17.5 | +47.5 | 0.0 |
| 4 | P1 | 42.5 | 66.5 | −41.5 | −109.5 |
| 5 | P1 | 20.0 | 44.0 | −4.0 | −4.0 |
| 6 | P1 | 20.0 | 86.5 | −36.5 | −36.5 |
| 7 | P1 | 25.0 | 91.5 | −41.5 | −41.5 |
| 8 | P1 | 15.0 | 81.5 | −31.5 | −31.5 |
| 9 | P1 | 30.0 | 74.0 | −4.0 | −4.0 |
| 10 | P1 | 15.0 | 59.0 | +21.0 | 0.0 |

TABLE 7

| Logic Block | Power Level | Time Delay | Abs. Time | Slack Time | Lateness Time | Derv |
|---|---|---|---|---|---|---|
| 1 | P2 | 19.2 | 19.2 | −26.8 | −70.2 | 196.5 |
| 2 | P3 | 19.8 | 19.8 | −27.4 | −70.2 | 144.3 |
| 3 | P2 | 15.2 | 15.2 | +52.8 | 0.0 | 0.0 |
| 4 | P2 | 37.6 | 57.4 | −27.4 | −70.2 | 196.5 |
| 5 | P2 | 18.4 | 38.2 | +7.8 | 0.0 | 20.0 |
| 6 | P2 | 16.0 | 73.4 | −23.4 | −23.4 | 65.5 |
| 7 | P2 | 20.0 | 77.4 | −27.4 | −27.4 | 70.5 |
| 8 | P2 | 12.0 | 69.4 | −19.4 | −19.4 | 60.3 |
| 9 | P2 | 24.0 | 62.2 | +7.8 | 0.0 | 20.0 |
| 10 | P2 | 12.0 | 50.2 | +29.8 | 0.0 | 0.0 |

TABLE 8

| Logic Block | Power Level | Time Delay | Abs. Time | Slack Time | Lateness Time |
|---|---|---|---|---|---|
| 1 | P2 | 19.2 | 19.2 | −28.2 | −87.6 |
| 2 | P2 | 25.2 | 25.2 | −34.2 | −92.8 |
| 3 | P1 | 17.5 | 17.5 | +47.5 | 0.0 |
| 4 | P2 | 34.0 | 59.2 | −34.2 | −87.6 |
| 5 | P1 | 20.0 | 45.2 | −5.2 | −5.2 |
| 6 | P1 | 20.0 | 79.2 | −29.2 | −29.2 |
| 7 | P1 | 25.0 | 84.2 | −34.2 | −34.2 |
| 8 | P1 | 15.0 | 74.2 | −24.2 | −24.2 |
| 9 | P1 | 30.0 | 75.2 | −5.2 | −5.2 |
| 10 | P1 | 15.0 | 60.2 | +19.8 | 0.0 |

TABLE 9

| Logic Block | Power Level | Time Delay | Abs. Time | Slack Time | Lateness Time | Derv |
|---|---|---|---|---|---|---|
| 1 | P3 | 15.0 | 15.0 | −13.2 | −43.8 | 146.0 |
| 2 | P3 | 20.4 | 20.4 | −18.6 | −43.8 | 163.3 |
| 3 | P2 | 15.2 | 15.2 | +52.8 | 0.0 | 0.0 |
| 4 | P3 | 28.2 | 48.6 | −18.6 | −43.8 | 146.0 |
| 5 | P2 | 18.4 | 38.8 | +7.2 | 0.0 | 26.0 |
| 6 | P2 | 16.0 | 64.6 | −14.6 | −14.6 | 73.0 |
| 7 | P2 | 20.0 | 68.6 | −18.6 | −18.6 | 78.0 |
| 8 | P2 | 12.0 | 60.6 | −10.6 | −10.6 | 68.0 |
| 9 | P2 | 24.0 | 62.8 | +7.2 | 0.0 | 26.0 |
| 10 | P2 | 12.0 | 50.8 | +29.2 | 0.0 | 0.0 |

TABLE 10

| Logic Block | #4 | | | #5 | | | #6 | | |
|---|---|---|---|---|---|---|---|---|---|
| | Power Level | Lateness Time | Derv | Power Level | Lateness Time | Derv | Power Level | Lateness Time | Derv |
| 1 | P2 | −69.6 | 140.0 | P3 | −45.0 | 52.5 | P3 | −42.7 | 53.4 |
| 2 | P3 | −69.6 | 52.5 | P3 | −45.0 | 52.5 | P3 | −42.7 | 53.4 |
| 3 | P1 | 0.0 | 0.0 | P1 | 0.0 | 0.0 | P1 | 0.0 | 0.0 |
| 4 | P2 | −69.6 | 140.0 | P3 | −45.0 | 52.5 | P3 | −42.7 | 53.4 |
| 5 | P1 | 0.0 | 0.0 | P1 | 0.0 | 0.0 | P1 | 0.0 | 0.0 |
| 6 | P1 | −23.2 | 70.0 | P1 | −15.0 | 75.0 | P1 | −15.9 | 79.5 |
| 7 | P1 | −28.2 | 75.0 | P1 | −20.0 | 85.0 | P2 | −15.9 | 53.0 |
| 8 | P1 | −18.2 | 65.0 | P1 | −10.0 | 50.0 | P1 | −10.9 | 54.5 |
| 9 | P1 | 0.0 | 0.0 | P1 | 0.0 | 0.0 | P1 | 0.0 | 0.0 |
| 10 | P1 | 0.0 | 0.0 | P1 | 0.0 | 0.0 | P1 | 0.0 | 0.0 |

TABLE 11

| Logic Block | #7 Power Level | #7 Lateness Time | #7 Derv | #8 Power Level | #8 Lateness Time | #8 Derv | #9 Power Level | #9 Lateness Time | #9 Derv |
|---|---|---|---|---|---|---|---|---|---|
| 1 | P3 | −41.4 | 51.7 | P3 | −41.1 | 51.4 | P3 | −37.9 | 47.4 |
| 2 | P3 | −41.4 | 51.7 | P3 | −41.1 | 51.4 | P3 | −37.9 | 47.4 |
| 3 | P1 | 0.0 | 0.0 | P1 | 0.0 | 0.0 | P1 | 0.0 | 0.0 |
| 4 | P3 | −41.4 | 51.7 | P3 | −41.1 | 51.4 | P3 | −37.9 | 47.4 |
| 5 | P1 | 0.0 | 0.0 | P1 | 0.0 | 0.0 | P1 | 0.0 | 0.0 |
| 6 | P2 | −12.8 | 42.7 | P2 | −13.7 | 45.7 | P2 | −14.3 | 47.7 |
| 7 | P2 | −16.8 | 56.0 | P2 | −17.7 | 59.0 | P3 | −13.3 | 16.6 |
| 8 | P1 | −11.8 | 59.0 | P2 | −9.7 | 32.3 | P2 | −10.3 | 34.3 |
| 9 | P1 | 0.0 | 0.0 | P1 | 0.0 | 0.0 | P1 | 0.0 | 0.0 |
| 10 | P1 | 0.0 | 0.0 | P1 | 0.0 | 0.0 | P1 | 0.0 | 0.0 |

TABLE 12

| Logic Block | #10 Power Level | #10 Lateness Time | #10 Derv | #11 Power Level | #11 Lateness Time | #11 Derv | #12 Power Level | #12 Lateness Time | #12 Derv |
|---|---|---|---|---|---|---|---|---|---|
| 1 | P3 | −35.7 | 44.6 | P4 | −16.2 | 7.0 | P4 | 0.0 | 0.0 |
| 2 | P3 | −35.7 | 44.6 | P4 | −16.2 | 7.0 | P4 | 0.0 | 0.0 |
| 3 | P1 | 0.0 | 0.0 | P1 | 0.0 | 0.0 | P1 | 0.0 | 0.0 |
| 4 | P3 | −35.7 | 44.6 | P3 | −16.2 | 20.2 | P4 | 0.0 | 0.0 |
| 5 | P1 | 0.0 | 0.0 | P1 | 0.0 | 0.0 | P1 | 0.0 | 0.0 |
| 6 | P3 | −10.9 | 13.6 | P3 | −4.4 | 5.5 | P3 | 0.0 | 0.0 |
| 7 | P3 | −13.9 | 17.4 | P3 | −7.4 | 9.2 | P3 | 0.0 | 0.0 |
| 8 | P2 | −10.9 | 36.3 | P2 | −4.4 | 14.7 | P2 | 0.0 | 0.0 |
| 9 | P1 | 0.0 | 0.0 | P1 | 0.0 | 0.0 | P1 | 0.0 | 0.0 |
| 10 | P1 | 0.0 | 0.0 | P1 | 0.0 | 0.0 | P1 | 0.0 | 0.0 |

TABLE 13

| Logic Block | Power Level | Delay Time | Abs. Time | Design Time | Slack Time | Lateness Time |
|---|---|---|---|---|---|---|
| 1 | P4 | 10.6 | 10.6 | — | 4.8 | 0.0 |
| 2 | P4 | 13.6 | 13.6 | — | 1.8 | 0.0 |
| 3 | P1 | 17.5 | 17.5 | — | 47.5 | 0.0 |
| 4 | P4 | 19.6 | 33.2 | — | 1.8 | 0.0 |
| 5 | P1 | 20.0 | 33.6 | — | 6.4 | 0.0 |
| 6 | P3 | 12.0 | 45.2 | 50 | 4.8 | 0.0 |
| 7 | P3 | 15.0 | 48.2 | 50 | 1.8 | 0.0 |
| 8 | P2 | 12.0 | 45.2 | 50 | 4.8 | 0.0 |
| 9 | P1 | 30.0 | 63.6 | 70 | 6.4 | 0.0 |
| 10 | P1 | 15.0 | 48.60 | 80 | 31.4 | 0.0 |

Table 11 shows an abbreviated summary of the calculated results from iterations No. 7, No. 8 and No. 9. These three iterations result in a decrease in the lateness time from −41.4 to −37.9, and an overall increase in power consumption penalty of from 11.9 to 12.4. It is to be noted that after the 9th iteration the logic block power levels have been increased to the P3 level in four logic blocks (1,2, 4 and 7), and have been increased to the P2 level in two logic blocks (6 and 7), and remain at the P1 power level for the remaining four logic blocks (3, 5, 9 and 10).

Table 12 shows in abbreviated form the results of the calculations of iterations No. 10, 11 and 12. After the 12th iteration the lateness time has reduced to 0.0 in all cases, and the DERV value is also reduced to 0.0. This indicates that the optimizing solution is present, and no further iterations are necessary in order to achieve the overall logic network timing requirements. The power consumption penalty resulting from iterations 10–12 range from 12.7 to 15.1, and the method indicates that the minimum power levels required in order to achieve operation within the design timing requirements requires that logic blocks 1, 2 and 4 be set to power level P4, logic blocks 6 and 7 be set to power level P3, logic block 8 be set to power level P2, and logic blocks 3, 5, 9 and 10 be set to the minimum power level P1. Table 13 shows the specific time calculations as a result of setting logic blocks 1–10 to the respective power levels indicated above. The column entitled "Absolute Time" shows that the signal outputs from logic blocks 1–10 vary from 10.6 to 63.6 (block 9), but when compared with the design time requirements, illustrates that logic blocks 6–10 all will have signal outputs within the required design times. As is mentioned above, the total power consumption penalty for this selection of power level options is 15.1 (milliwatts).

The data shown in Table 13 is also illustrated in the graph of FIG. 3 as the middle curve. This curve shows that all logic blocks have positive slack values, and it represents a solution which is very close to the best possible solution for the design parameters considered in the example. By contrast, the right-most curve on FIG. 3 illustrates the relative timing had all of the logic blocks been set to power level P5. Using this curve, it is apparent that the overall logic network would have easily met the timing requirements of the design, but at a power consumption penalty of 46.0, or over three times the power consumption which is required for an optimum selection of power drive levels as determined by the present method.

FIG. 3 is generally illustrative of the progress of intermediate solutions as a result of practicing the method. The left-most curve on FIG. 3 shows the best case power consumption requirements, but the worst case timing requirements. This curve illustrates that approximately 90 percent of the circuits have a negative slack value, indicating that the overall circuit performance is far from meeting the minimum timing requirements. As the iterative method steps are performed the intermediate solutions trend is toward the right of the graph of FIG. 3. The best case timing solution is shown as the right-most curve on FIG. 3, but this solution is found under conditions of worst case power consumption. This solution also exceeds the minimum timing requirements, as all circuits have positive slack values ranging from +20 to +30. The solution therefore represents design overkill, for the power consumption is well in excess of the power needed in order to achieve the design timing requirements. The center curve of FIG. 3 is representative of close to the optimum design solution, as is shown in Table 13, for under these conditions the slack values of all circuits are slightly positive and the penalty in power consumption is approximately 30 percent of the design overkill solution.

It is possible to vary some of the detailed execution steps of the method described herein to achieve the desired results. For example, the preferred method of performing a timing analysis for determining the signal timing delays through each of the circuit blocks is described in U.S. Pat. 4,263,651, issued Apr. 21, 1981, but other forms of timing analysis may be equally well applied for this step of the method.

The step of calculating lateness values for each circuit block should involve only negative slack values, since it is the negative slack values associated with circuit blocks that reflect the real timing problems. After calculating the lateness value it is possible to sort out the circuit blocks by the amount of negative slack which each circuit block controls. In other words, this step enables the determination of which circuit blocks are the funnels of negative slacks.

The computation of performance derivatives is a computation of the change in lateness with respect to the change in power performance level. This computation reveals the potential of any given circuit block for removing negative slacks as a result of an incremental increase in the power applied to the circuit block. If a circuit block performance derivative has a non-zero value, it has the potential for removing some negative slack from the design. In selecting which of the circuit blocks to increase the power drive levels, as a result of identifying which circuit blocks have the highest performance derivatives, it may be desired to increase the power drive levels in more than one circuit block during each iterative step of performing the method. For example, n% of the circuit blocks having the highest performance derivatives may be incrementally increased during a single iterative step, thereby reducing the total number of iterative steps required for completion of the method. However, if this option is selected care should be taken not to increase the power drive levels of circuit blocks having high performance derivatives, which circuit blocks are driven by other circuit blocks having high performance derivatives. This caution should be taken, since increasing the power drive level of the first circuit block in a serial chain of circuit blocks having high performance derivatives may remove the serial lateness conditions observed in the subsequent circuit blocks. It may be later necessary to apply the reverse process, because lower power levels may not cause any "lateness".

In incrementally increasing the power drive levels of the various circuit blocks during the performance of the method it may be desirable to incrementally increase circuit drive level by more than a single power drive level step. For example, it may be desirable to increase a given circuit block from a P1 power level to a P3 power level during a single iteration of the method, to thereby reduced the total number of iterations required.

As has been indicated above, the iterative method steps are performed until such time as no further power performance changes occur, and no negative slacks exist in any of the circuit blocks. If the solution reveals that no further change in power performance levels are observed, but negative slacks still exist in some of the circuit blocks, it must be concluded that the technology of the circuit design cannot support the specified timing requirements which are imposed upon the overall network. In this case, either a timing requirement modification must be made, or a logic design change must be made, or a technology change must be made to another form of circuit.

It is apparent that the various calculations and iterative steps required for performance of the method may be implemented with the assistance of computer software routines. Such software routines can be readily prepared for execution of each of the iterative method steps, and will enable convergence to the desired solution to occur in a relatively short time. By contrast, software routines can also be written to make a comparison of all possible power drive levels as a function of all possible delay times, but as a practical matter the solution is only effective for very small logic networks. For example, for the relatively simple example chosen for illustration of the method herein, there exist about 10 million possible solutions involving all of the variables discussed herein.

In order to verify the effectiveness of the method described herein a computer program was written for the present example, to exhaustively try all possible power level assignments which could be used in the logic network of FIG. 1. The program was written to test all of the 10 million possible solutions to the problem, to determine which power level selections would meet the design timing requirements at the very least power consumption penalty. This exhaustive study produced seven solutions out of the 10 million possible solutions that produce a lower power consumption penalty than the method described herein. The very best solution out of the 10 million possibilities produces a power consumption penalty of 1.41, by setting the power drive level of all logic blocks to the same selection as chosen by the present method, with the exception of logic block 1 and logic block 8. The very best solution requires logic block 1 to be set to power level P3 and logic block 8 to be set to power level P1, for a net savings in power consumption in the example chosen of approximately 5 percent. An exhaustive solution of the type attempted for the example described herein is not a possible alternative for more complex logic networks. For very large VLSI chips, accommodating perhaps 2,000–3,000 logic circuits, there is no possible way, even with advanced computer techniques, to arrive at all of the possible solutions. Accordingly, the present method enables the selection of optimum power levels consistent with design timing requirements through an iterative procedure which closes rapidly toward the optimum solution.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A method of optimizing signal timing delays and power consumption through multi-path LSI circuit networks constructed from a plurality of circuit blocks, each circuit block having associated therewith a plurality of selectable power drive levels which determine circuit block signal timing delays, the objective of the method being to reduce an LSI circuit network signal timing delay to less than a predetermined maximum signal timing delay while at the same time achieving the lowest LSI circuit network power consumption consistent therewith, comprising the steps of (a) determining the timing delays and power consumption characteristics of each circuit block for all of the plurality of power drive levels;

(b) calculating the timing delays, at a first power drive level, through all of the circuit blocks and determining the circuit network timing delays by summing circuit block timing delays through the multi-path circuit network;

(c) calculating a "slack time" value for each circuit block by subtracting the circuit network timing delays from the maximum permissible circuit network timing delays, and allocating this difference as a "slack time" value for each circuit block according to its relative timing delay through the multi-path circuit network;

(d) calculating a "lateness time" value for each of the circuit blocks by summing the circuit block "slack time" values through the multi-path network of circuit blocks which contribute to circuit network timing delays;

(e) repeating step (b)–(d) at a second power drive level;

(f) forming a performance derivative for each circuit block by subtracting the second power drive level "lateness time" value from the first power drive level "lateness time" value, and dividing the result by a denominator formed by subtracting the second power drive level power consumption from the first power drive level power consumption;

(g) identifying the circuit blocks having the highest performance derivatives, and setting the power drive level of at least one of such circuit blocks to the second level while returning the remaining circuit blocks to the first power drive level;

(h) repeating the steps (b)–(g) by substituting the power drive level selected in step (g) for the original first power drive level, and substituting an incrementally increased power drive level for each circuit block for the second power drive level, until all circuit blocks "lateness time" values are reduced to substantially zero; and (i) physically implementing in the LSI circuit network the power drive levels of each circuit block as determined from step (h) as the operable power drive levels of each of the circuit blocks.

2. The method of claim 1, wherein the step (g) of identifying the circuit blocks having the highest performance derivatives further comprises identifying only one circuit block.

3. The method of claim 1, wherein the step (g) of identifying the circuit bocks having the highest performance derivatives further comprises identifying n % of said circuit blocks, where n is a nonzero number.

4. The method of claim 1, wherein the step (e) of repeating at a second power drive level further comprises repeating at the next highest incremental power drive level.

5. The method of claim 4, wherein the step (g) of identifying the circuit blocks having the highest performance derivatives further comprises identifying n % of said circuit blocks, where n is a nonzero number.

6. A method of optimizing signal timing delays through multi-path LSI circuit networks constructed from a plurality of circuit blocks, each circuit block having associated therewith a plurality of power drive levels which are selectable for controlling the timing delays through the circuit block, wherein the method of optimizing further comprises reducing the network signal timing delays to less than predetermined maximum permissible network signal timing delays at the lowest obtainable network power consumption, comprising the steps of (a) initializing all circuit block power drive levels to their respective lowest levels;

(b) determining the signal timing delays through each of the circuit blocks;

(c) determining the maximum signal timing delays through the entire circuit network;

(d) calculating a "slack time" value for each of the circuit blocks by subtracting the maximum signal timing delays from the maximum permissible signal timing delays, and allocating "slack time" values to each circuit block according to its respective timing delay;

(e) calculating a "lateness time" value for each of the circuit blocks by summing the "slack times" of the respective circuit blocks with the "slack times" of all circuit blocks in the entire network which contribute to signal delay to the respective block;

(f) incrementing all circuit block power drive levels to their respective next higher levels;

(g) repeating steps (b)–(e) to calculate a new "lateness time" value for each of the circuit blocks at the respective next higher power drive levels;

(h) forming a performance derivative for each circuit block by subtracting the "lateness time" value calculated in step (g) from the "lateness time" value calculated in step (e), and dividing the result by a denominator formed by subtracting the circuit block incremented power drive level from the previous power drive level;

(i) identifying the circuit blocks having the highest performance derivatives and retaining the incremented power drive level for at least one circuit block having the highest performance derivative while returning the remaining circuit blocks to their last previous power drive levels; and (j) repeating steps (b)–(i) until all "lateness time" values are substantially reduced to zero, and choosing the respective circuit block power drive levels which are used to derive this result, and physically implementing in the LSI circuit network each of the chosen power drive levels in the respective circuit blocks as the operable power drive level for the circuit block.

* * * * *